No. 626,693. Patented June 13, 1899.
W. H. HART, Jr.
BICYCLE SUPPORT.
(Application filed Mar. 5, 1898.)
(No Model.) 2 Sheets—Sheet 1.

WITNESSES:
P. F. Eagle.
L. Douville.

INVENTOR
William H. Hart Jr.
BY
Wiedersheim & Fairbanks
ATTORNEYS.

THE NORRIS PETERS CO., PHOTO-LITHO., WASHINGTON, D. C.

No. 626,693. Patented June 13, 1899.
W. H. HART, Jr.
BICYCLE SUPPORT.
(Application filed Mar. 5, 1898.)
(No Model.) 2 Sheets—Sheet 2.
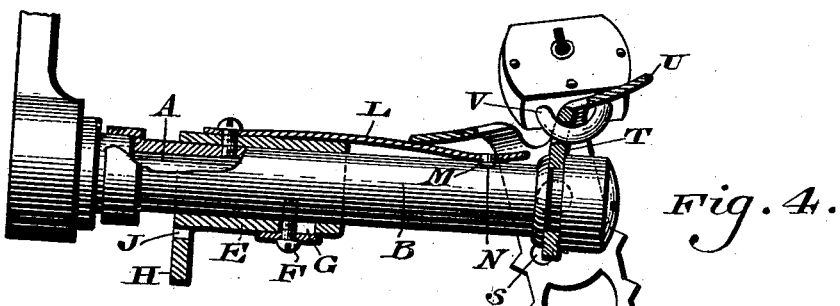
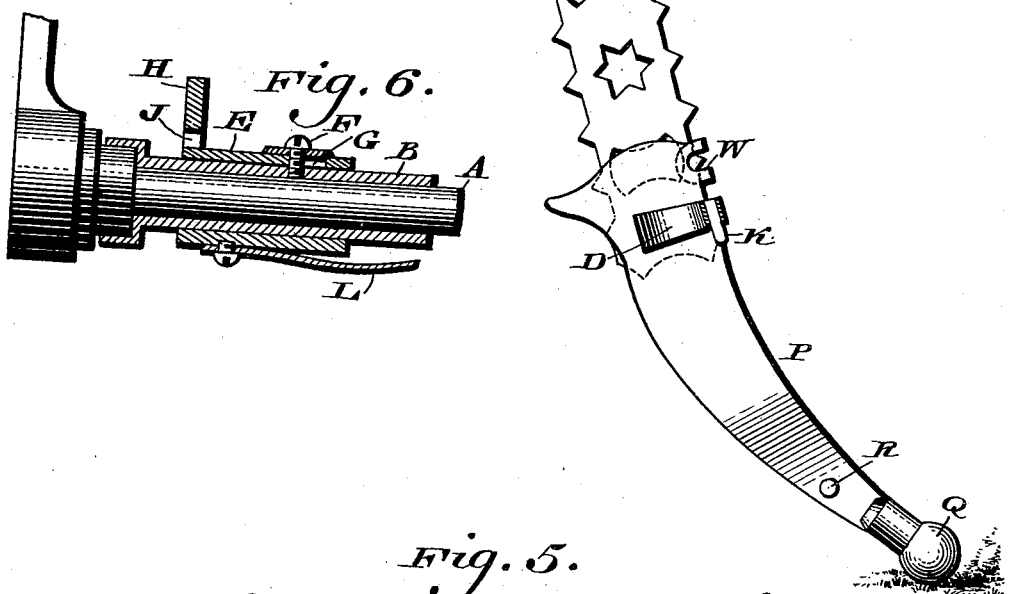
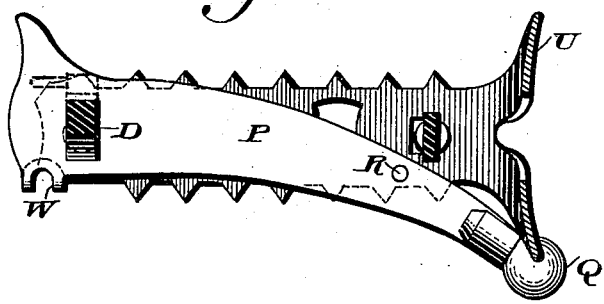
WITNESSES:
P. H. Eagle.
L. Douville.
INVENTOR
William H. Hart Jr.
BY
Diedersheim & Fairbanks.
ATTORNEYS.

UNITED STATES PATENT OFFICE.

WILLIAM H. HART, JR., OF PHILADELPHIA, PENNSYLVANIA.

BICYCLE-SUPPORT.

SPECIFICATION forming part of Letters Patent No. 626,693, dated June 13, 1899.

Application filed March 5, 1898. Serial No. 672,656. (No model.)

*To all whom it may concern:*

Be it known that I, WILLIAM H. HART, Jr., a citizen of the United States, residing in the city and county of Philadelphia, State of Pennsylvania have invented a new and useful Improvement in Bicycle Pedals and Supports, which improvement is fully set forth in the following specification and accompanying drawings.

My invention consists of a bicycle-pedal which is adapted to be converted into a support.

It also consists in providing the pedal with legs for increasing the length of the former.

It also consists of means for retaining the pedal on the crank in the normal position thereof.

It also consists of means whereby the pedal may be locked when in a position to act as a support.

It also consists of details of construction, as will be pointed out in the claims that follow the specification.

Figure 1:
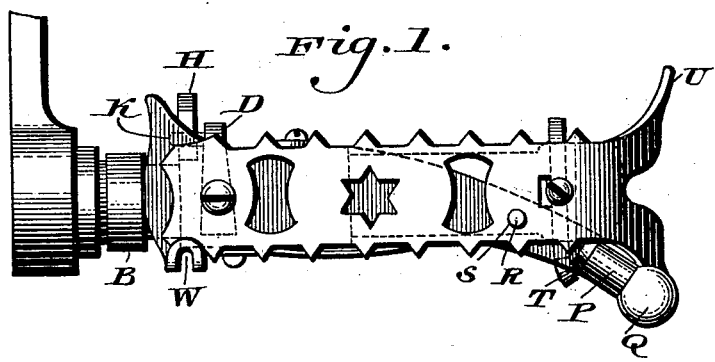
Figure 2:
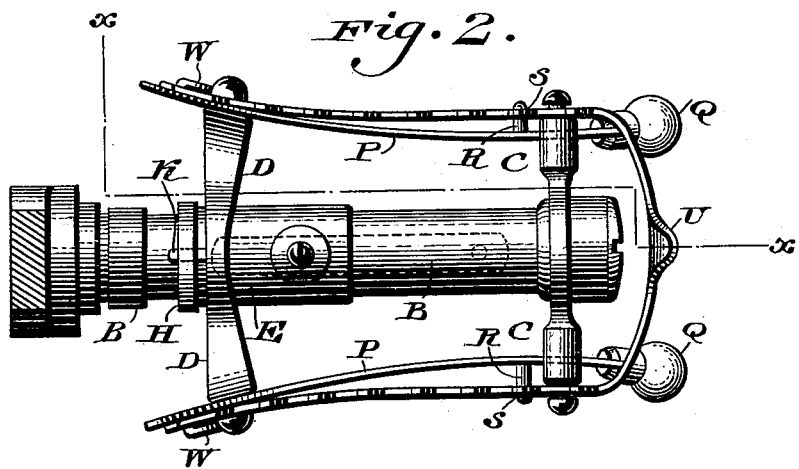
Figure 3:
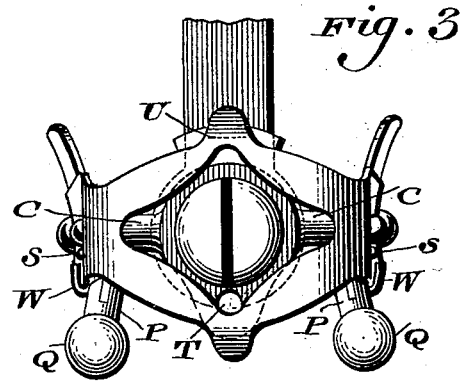

Figure 1 represents a side elevation of a bicycle pedal and support embodying my invention. Fig. 2 represents a top or plan view thereof. Fig. 3 represents an end view thereof. Fig. 4 represents a partial side elevation and partial longitudinal section of the pedal, being shown as converted into a support. Fig. 5 represents a vertical section of a portion on line $x$ $x$, Fig. 2. Fig. 6 represents a longitudinal section of a portion of the bicycle-crank and adjacent surrounding parts.

Similar letters of reference indicate corresponding parts in the figures.

Referring to the drawings, A designates one of the horizontal limbs of the crank or pedal shaft of a bicycle, on which limb is freely fitted the sleeve B, near whose outer end are the laterally-extending arms C, on which is mounted the outer end of the pedal-frame, whereby the latter is permitted to turn on said arms, so as to be placed in horizontal position on said limb A, as in Figs. 1, 2, 3, and 5, or overturned and depend from said arms, as in Fig. 4.

Connecting the side limbs of the pedal-frame, at the inner end thereof, is the cross-piece D, which when the pedal is in position (shown in Figs. 1, 2, 3, and 5) rests on the sliding collar E, the latter being mounted on the sleeve B and guided thereon in its motions by means of the pin F, which passes through the slot G in said collar, and is secured to the sleeve B and most plainly shown in Fig. 6. On said collar is the outwardly-projecting ear H, the same having an opening J therein to receive the pin K, whereby the pedal may be interlocked with said collar, and thus prevented from turning on its axis on the arms C. In order to interlock said collar and prevent sliding motions thereof, it has connected with it the elastic or spring catch or plate L, which extends in the longitudinal direction of the collar and carries at its outer end the stud M, which is adapted to drop into or enter the recess N in the sleeve B, as most clearly shown in Fig. 4, whereby the collar is controlled.

Connected with the inner end of the pedal-frame are the elastic or spring-pressed legs P, which are adapted to be folded on the sides of said frame when the latter is in horizontal position on the limb A, as shown in Figs. 1, 2, 3, and 5, the outer ends of said legs being provided with knobs or feet Q. In order to hold or retain the legs in their folded position, they are provided with pins or studs R, which are adapted to spring into openings S in the pedal-frame for retaining said legs in folded position, as most clearly shown in Fig. 5.

On the sleeve B, at the outer end thereof, is the eye T, which depends therefrom when the pedal is in the position shown in Fig. 1.

The outer end of the pedal-frame is formed with the ear U, which when the pedal is overturned is adjacent to the eye T, whereby the shackle V of a padlock may be passed through the openings of said eye and ear and when locked prevent the return of the pedal-frame to its normal position.

At the pivotal ends of the legs P are lips W, which when said legs are unfolded are adapted to abut against the adjacent portion of the sides of the pedal-frame as stops, thus limiting the outward or unfolding motion of said legs.

The operation is as follows: When the parts are in position shown in Figs. 1, 2, and 3, the pedal-frame presents its tread to the foot and may be rocked on the pedal-shaft and operated to cause the running of the bicycle, as usual. When the bicycle is not in use and it is desired to support the same, the pin N of the spring plate or bar L is withdrawn from the socket or recess N in the sleeve B and the collar E retracted, whereby the ear H is withdrawn from the pin K, thus releasing the cross-bar, and consequently the pedal-frame, from the locking action of said pin and ear. The pedal-frame is now on its axis both on the arms C and the pedal-shaft, thus assuming the position shown in Fig. 4. The legs are also unfolded and have their feet Q rested on the ground, thus serving to support the bicycle, as also shown in said Fig. 4, it being noticed that the pedal-frame is utilized as the support, the legs increasing the length thereof. When the legs are again folded, the stud M is sprung into the recess N and the pedal-frame is restored to its normal position, as in Fig. 1. The collar E is now moved toward the cross-bar D, so that the pin K of the latter enters the eye H and the recess or stud M drops into the recess N of the sleeve B, thus locking the collar and controlling the pedal-frame, so that the latter is prevented from unfolding without interfering with the operation for propelling or running the bicycle.

Where the bicycle is to be supported adjacent to an embankment or on a sidewalk adjacent to the curb thereof, the legs may remain folded on the pedal-frame.

Having thus described my invention, what I claim as new, and desire to secure by Letters Patent, is—

1. A pedal-shaft sleeve, a pedal-frame pivotally mounted on said sleeve, and resilient legs pivotally connected with said frame.

2. A pedal-shaft sleeve, a pedal-frame pivotally mounted on said sleeve and resilient legs pivotally connected with said frame, said frame and legs being detachably connected by studs which extend from said legs and are adapted to spring into said frame.

3. A bicycle-crank having a sleeve on the pedal-shaft thereof, a pedal-frame pivotally connected with said sleeve, a sliding collar on said sleeve, a cross-bar on the inner end of said frame, a pin projecting inwardly from said bar, and an ear on said sliding collar to receive said pin.

4. In a bicycle-support, a pedal-shaft sleeve, a pedal foot-rest frame mounted thereon, a collar in said sleeve provided with means for locking said frame when folded, and a catch on said collar adapted to engage said sleeve for locking said collar.

5. In a bicycle-support, a pedal-frame pivotally connected with the pedal-shaft sleeve, and extension-legs pivoted to said frame, and provided with lips which abut against said frame.

6. In a bicycle-support, a pedal-shaft sleeve, laterally-extending arms connected with said sleeve, a pedal foot-rest frame pivotally mounted on said arms, resilient legs pivoted to said frame and adapted to interlock therewith, a cross-bar connecting the inner ends of said pedal-frame, a sliding collar on said sleeve, an ear on said collar, and a pin on said bar adapted to enter said ear.

7. A pedal foot-rest frame mounted on the pedal-shaft sleeve and adapted to be overturned and swung downwardly, an extending resilient leg pivoted to said frame and adapted to form a continuation of said frame and to be folded on the same, means for connecting said legs with said frame when folded and means for connecting said frame and legs with said sleeve when said frame and legs are in folded condition.

8. A bicycle pedal-frame adapted to be transposed from a horizontal position on a pedal-shaft to a vertical or somewhat vertical position, pendent from said shaft and provided with a leg adapted to extend the length of said frame.

9. A bicycle pedal-frame having a pivotal connection with a sleeve on the pedal-shaft, whereby it may be placed from a horizontal into a vertical or comparatively vertical position as a support for a bicycle, a swinging leg mounted on said frame and means connected with the said leg for holding the latter in operative position as a downward extension of said frame.

10. In a bicycle-support, a pedal-shaft sleeve provided with the eye T and a pivoted pedal-frame provided with the ear U, said eye and ear when said frame is overturned having their openings at coincident places to receive the shackle of a lock.

WILLIAM H. HART, Jr.

Witnesses:
JOHN A. WIEDERSHEIM,
WM. C. WIEDERSHEIM.